United States Patent [19]

Schmid

[11] 3,996,523
[45] Dec. 7, 1976

[54] DATA WORD START DETECTOR

[75] Inventor: Anton Schmid, Munich, Germany

[73] Assignee: Messerschmitt-Bolkow-Blohm GmbH, Munich, Germany

[22] Filed: May 19, 1975

[21] Appl. No.: 578,751

[30] Foreign Application Priority Data

May 24, 1974 Germany .......................... 2425147

[52] U.S. Cl. .............................. 328/110; 328/129; 328/55; 328/72; 328/58

[51] Int. Cl.² ......................................... H03K 5/20

[58] Field of Search .......... 340/172.5; 328/37, 129, 328/103, 72, 58, 55

[56] References Cited

UNITED STATES PATENTS

| | | | |
|---|---|---|---|
| 3,310,751 | 3/1967 | Atzenbeck ....................... | 328/37 X |
| 3,505,594 | 4/1970 | Tarczy-Hornoch et al. ... | 328/129 X |
| 3,579,126 | 5/1971 | Paul .................................. | 328/129 |
| 3,611,159 | 10/1971 | Florsheim et al. ................. | 328/129 |

Primary Examiner—John S. Heyman
Attorney, Agent, or Firm—Toren, McGeady and Stanger

[57] ABSTRACT

In the disclosed detector, data is passed into two channels. In one channel successive interword pulses are gated out and the resulting pulses stretched at least one-half pulse width. In the second channel pulses representing the entire data word stretched so that the interword pulses overlap. After the data words are suitably synchronized to equalize the stretching delays, an exclusive OR gate compares the channel outputs to produce a step representing the interword interval. The step opens a counter which counts a predetermined number of clock pulses to define the beginning of the next word. A delay at the beginning of the channels eliminates any lead between the data and the corresponding clock pulses.

7 Claims, 15 Drawing Figures

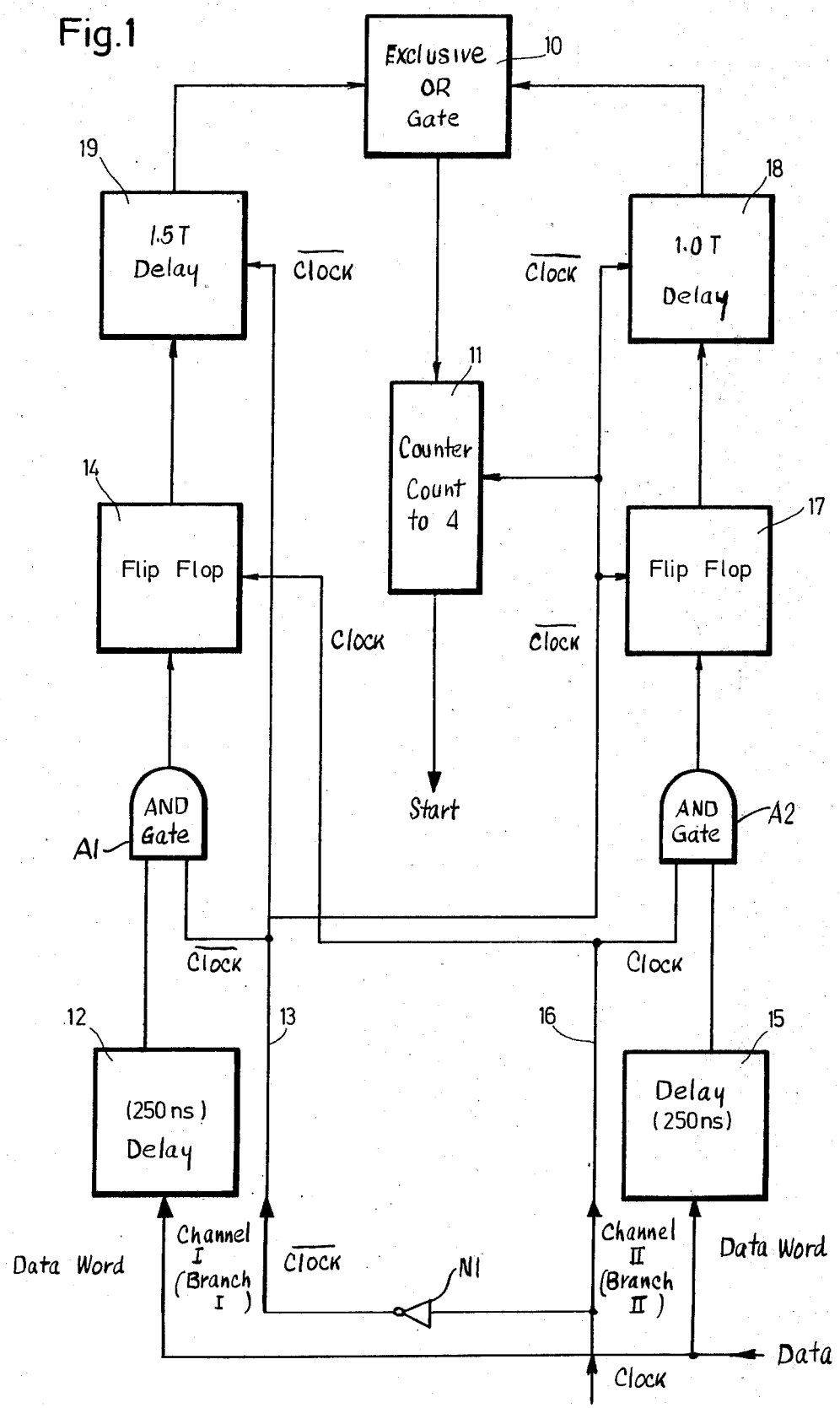

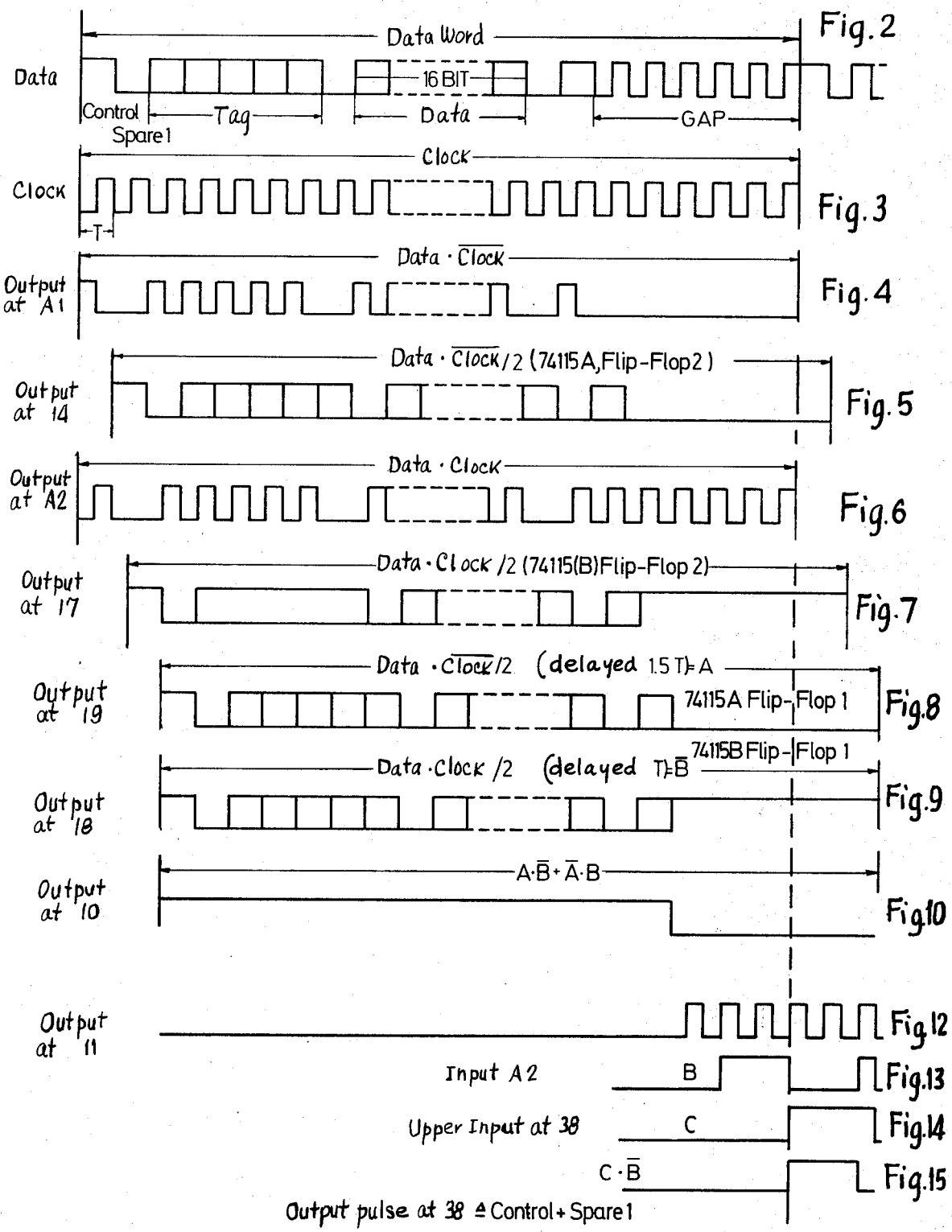

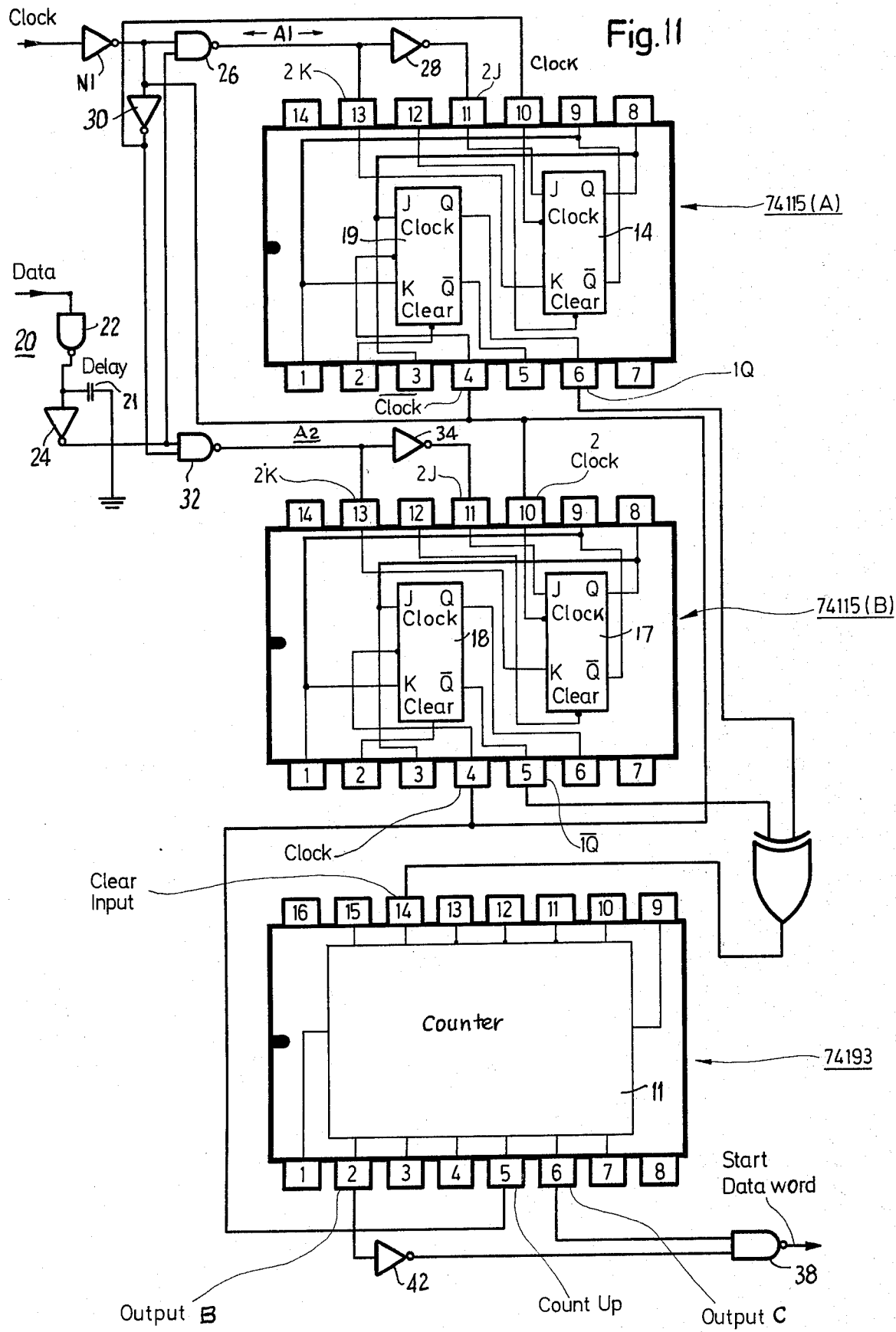

DATA WORD START DETECTOR

BACKGROUND OF THE INVENTION

This invention relates to apparatuses for detecting the beginnings of data words into digital data transmission, such as between individual apparatuses of an avionics system and particularly to devices which may be called digital word start detectors, interword space detectors, stop code detectors, start code detectors, or GAP detectors.

Such detectors may be composed of two switching branches which define a trigger pulse for the beginning of a data word by comparing the output signals of the branches.

Such detectors operate with signals that may be designated interword spacer pulses, or start and stop code pulses. These pulses serve to time separate the individual signals proper at a data receiver. The data transmission between individual apparatuses of an avionics system is effected primarily by means of serial digital signals. Up to 32 signals can be transmitted successively on one data channel. This transmission takes place periodically and in the order of the signals 1, 2, 3,...32 etc. Each signal is composed of a 26 bit data word. Apart from the 16 bit signal proper, the word contains a number of recognition and test pulses and six so-called stop code or start code pulses (GAP pulses) at the end or beginning of each data word. The stop code or start code pulses signal the end of a word of the beginning of a new word.

Heretofore, known detectors counted the bits of the data word and depended on the length of the data word. The disadvantage of such known devices is that the apparatus is not suitable for changes or can be adapted for changes only with great difficulty.

Other known detectors of the above-mentioned type use monoflops. However, these embodiments depend upon the clock frequency and must therefore be specially calibrated.

An object of the invention is to improve the aforementioned devices.

Another object of the invention is to produce a pulse code detector which is independent of the clock frequency and the length of the data word. The term "stop code pulses" is used for simplicity to define the signals which separate the words.

SUMMARY OF THE INVENTION

According to a feature of the invention, the data signal is delayed a time longer than the maximum permissible lead of the data word relative to the clock signal.

According to another feature of the invention, the delayed signal is passed through two channels in one of which the delayed signal is gated with the clock pulses to eliminate the stop code pulses and the word pulses thereafter delayed in both channels so that the stop code pulses in the other channels at least run into each other, and then the resulting signals synchronized with suitable delays and compared to produce a step representing the delayed initiation of the stop code pulses. A counter counts a predetermined number of clock pulses after the step to establish the beginning of the next word.

According to another feature of the invention each branch includes skew flip-flops. This permits the input signals to be changed during the clock pulses without introducing wrong information.

According to another feature of the invention, the stretching is accomplished by suitable J K master-slave flip-flops.

These and other features of the invention are pointed out in the claims. Other objects and advantages of the invention will become evident from the following detailed description of the accompanying drawings.

BRIEF DESCRIPTION OF THE DRAWINGS

In the drawings:

FIG. 1 is a block diagram illustrating a circuit embodying features of the invention.

FIGS. 2 to 10 are respective graphs illustrating the outputs at various elements in the circuit of FIG. 1.

FIG. 11 is a schematic diagram of a circuit similar to FIG. 1 and embodying features of the invention.

FIGS. 12 to 15 are graphs illustrating output waveforms of portions of the circuit in FIG. 11.

DESCRIPTION OF PREFERRED EMBODIMENTS

In FIG. 1, the input data is divided into two switching channels or branches I and II. The system disclosed produces a trigger pulse denoting the start of a data word by ultimately comparing the signals in each channel with an exclusive OR gate 10 and counting up to four in a counter 11.

A 250 ns delay 12 applies the input data in branch I to an AND gate A1. The latter also receives inverted clock pulses through an inverter N1. The delayed data and clock pulses for one data word are shown in FIGS. 2 and 3.

The AND gate produces the output shown in FIG. 4. Here the stop code or GAP information composed of six timing pulses at the end of the word is eliminated. The signal level during the stop code remains at logic zero. A flip-flop 14 responds to the AND gate A1 and the clock signal to return the data word to its original state but without the stop code. This is shown in FIG. 5. A second flip-flop 19 delays the output of the flip-flop 14 1.5 pulse periods, namely 1.5 T, where T is equal to the pulse period. This is shown in FIG. 8.

In the second channel 2, a delay line 15 also delays the data word 250 ns. An AND gate A2 receives the delayed signal together with the clock signal. The output of the AND gate A2 appears as shown in FIG. 6. Here, the stop code composed of 6 timing pulses at the end of the word is retained. A flip-flop 17 returns the data word effectively to its original state. However, the flip-flop acts upon each particular applied pulse so that the stop code is also lost at the output of flip-flop 17. However, here the logic level is 1 as shown in FIG. 7. A flip-flop 18 adds a delay equal to 1.0 T. The 1.0 T and 1.5 T delays in flip-flops 18 and 19 synchronize the data word in branches I and II as shown in FIGS. 8 and 9.

An exclusive OR gate 10 compares the outputs of the two branches I and II and produces a pulse corresponding to the width of the stop code as shown in FIG. 10. However, this pulse is delayed by 2.5 timing pulses relative to the stop code in the original data word. Counting the timing pulsed during the duration of this pulse reveals that the start of the 4th pulse corresponds to the beginning of the data word. Therefore, the counter 11 counts to the fourth pulse and produces a pulse whose length is equal to the control and spare 1 of the next data word.

The invention eliminates the need for readjustment of any RC circuits if the clock frequency varies.

A more detailed representation of the circuit in FIG. 1 appears in FIG. 11. Here the flip-flops and counters are illustrated as parts of commercially available integrated circuit chips. Corresponding parts are designated with the same numerals.

In FIG. 11 a delay 20 is formed by a capacitor 21 together with a preceding AND gate 22 and a following inverter. The delay 20, corresponding to delays 12 and 15, delays the data 250 nanoseconds. This time exceeds the maximum time-lead tolerance of the data word relative to the clock pulses, i.e., the maximum permissible time that the data word is allowed to lead the clock pulses.

A NAND gate 26 receives the delayed data as shown in FIG. 2 and the clock pulses shown in FIG. 3 inverted by the inverter N1. An inverter 28 at the output of the NAND gate inverts the output of NAND gate 26 to produce a signal corresponding to that of FIG. 4. Thus the NAND gate 26 and the inverter 28 correspond to the AND gate A1. As shown in FIG. 4, the stop code is substantially eliminated.

The signal of FIG. 4 at the output of inverter 28, and the complement thereof at the output of NAND gate 26 are applied to J and K inputs of a clocked master-slave flip-flop 14. This flip-flop forms half of an integrated circuit chip or module designated cmmercially as 74115. It is also available as 74111. The complementary signals to the J and K inputs of the flip-flop 14 cause the Q output to assume the condition at the J input at the end of each succeeding clock signal applied thereto. The clock signal applied to the flip-flop 14 corresponds to the uninverted clock signal because of the action of an inverter 30 intervening between the inverter N1 and the flip-flop clock input.

As each signal is applied to the input J of flip-flop 14, the output Q is delayed and each pulse is stretched by a time 0.5T. This is shown in FIG. 5.

The delay 20 also delays the data into the channel 2. A NAND gate 30 and inverter 32 perform the functions of the AND gate A2. The NAND gate 30 receives clock signals doubly inverted by inverters N1 and 30. The output of the inverter 34, i.e., the output of the AND gate A2, appears as shown in FIG. 6. Here, the stop code is not eliminated. The output of the AND gate A2 and its complement are respectively applied to the inputs J and K of the flip-flop 17.

The output of flip-flop 17 changes corresponding to the changes in J on the basis of every clock pulse inverted by the inverter N1. Here again each negative going edge is delayed 0.5 T longer than each positive going edge. This stretches each pulse having a period of 0.5 T to T. As a result, the stop code signals produce a continuous logic 1 as shown at the end of FIG. 7.

The Q and $\bar{Q}$ outputs of the flip-flop 14 are applied to the J and K inputs of the flip-flop 19 which forms the other half of the 74115 integrated circuit. The flip-flop 19 responds to inverted clock signals and delays the signals 1.5 T. The signals as they appear at the output Q of flip-flop 19 are shown in FIG. 8. Similarly, the outputs Q and $\bar{Q}$ of flip-flop 17 are applied to the inputs J and K of flip-flop 18 respectively. The flip-flop 18 forms the second half of the integrated circuit 74115 in the center of FIG. 3. The flip-flop 18 responds to the inverted clock signal and delays the output signal by the time T. Thus the output appearing at $\bar{Q}$ of the flip flop 18 has the waveform shown in FIG. 9.

The exclusive OR gate 10 receives the outputs of the flip-flops 18 and 19 and produces the response shown in FIG. 10. This output clears the binary counter 11 until the end of the data word near the stop code. The counter 11 is available commercially as a logic module 74193. At this point the counter 11 starts counting the pulses as shown in FIG. 12. The counter counts to the start of the fourth pulse. This corresponds to the beginning of the data word. It produces two outputs as shown in FIGS. 13 and 14. A NAND gate 38 receives the output C of gate 14 and the output B shown in FIG. 13 but inverted by the inverter 42. The resulting output appears in FIG. 15. The pulse there starts at the beginning of the next word and continues through the control and spare 1 of the next word.

While embodiments of the invention have been described in detail, it will be obvious to those skilled in the art that the invention may be embodied otherwise without departing from its spirit and scope.

A manufacturer which produces the integrated circuits mentioned is

TEXAS INSTRUMENTS INC.
Headquarters- Gen. Offices
Dallas, Texas 75222.

What is claimed is:

1. A word start detector for a digital data transmission network in an avionics system using data words and timing pulses variable in time from the data words by a predetermined maximum as well as stop code pulses, said detector comprising two switching branches, means for applying data words to the two branches, first logic means in one of the branches for responding to the data words and the timing pulses at relative phases which retain the stop code pulses, second logic means in the other branch for responding to the data words and the timing pulses at relative phases which eliminates the stop code pulses, first pulse stretching means in one of the branches coupled to said first sampling means and second pulse stretching means in one of the branches coupled to said second sampling means for stretching the outputs of said sampling means, means coupled to said first and second stretching means for comparing signals at the output of said stretching means, each of said logic means including delay means coupled to at least one channel and having a delay greater than the predetermined maximum variable time of the data word relative to the timing pulses.

2. A system as claim 1, characterized in that said stretching means each include a flip-flop with edge-defined switching behavior.

3. For a system utilizing clock pulses and data words composed of word pulses and stop codes are transmitted pulses variable in time from the clock pulses by a predetermined maximum, a word start detector comprising input means responsive to the data words for supplying waveforms corresponding to the data words, gate means coupled to said input means and responsvie to the waveforms and the clock pulses for eliminating the stop code in each data word, first pulse stretching means coupled to said gate means for stretching each pulse emitted by said gate means at least one-half clock pulse interval, second pulse stretching means coupled to said input means for maintaining the stop code pulse in the waveform and stretching the pulses of the data word at least one-half the period of a clock signal, said stretching means each imparting predetermined delays to the pulses, delay means coupled to at least one of the stretching means for equallizing delays imparted to signals by said stretching means, comparison gate means coupled to the outputs of each of said pulse stretching means for comparing the signals at the output of each of the stretching means to produce an output when the signals have a given logic relationship so as to produce a logic shift representing the start of the stop code as delayed by said stretching means and said delay means, counter means coupled to said comparison gate means and responsive to the clock signals for counting clock signals after each shift for a number of clock signals equal to the time of the stop code of said stretching means and the delay means less the delay and for producing an output after the count, and second delay means in said input means for delaying the data word relative to the clock pulses for a period of time greater than the maximum permissible lead of the data word relative to the clock pulses.

4. A detector as in claim 3, characterized in that said stretching means each includes a flip-flop responsive to an edge of the clock pulses.

5. An apparatus as in claim 3, wherein said stretching means each includes a J K master-slave flip-flop respectively responsive to respective complements of the clock signals.

6. An apparatus as in claim 5, wherein said gate means include an AND gate.

7. An apparatus as in claim 3, wherein said second stretching means includes second gate means, said first gate means and said second gate means each being responsive to respective complements of said clock signals.

* * * * *